United States Patent
Chandhoke et al.

(10) Patent No.: US 11,321,341 B2
(45) Date of Patent: May 3, 2022

(54) DYNAMIC METADATA EXTRACTION WORKFLOW FOR MEASUREMENT DATA STORAGE

(71) Applicant: NATIONAL INSTRUMENTS CORPORATION, Austin, TX (US)

(72) Inventors: Sundeep Chandhoke, Austin, TX (US); Michael S. Watson, Austin, TX (US); Alejandro del Castillo, Austin, TX (US); Daren K. Wilson, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 16/875,669

(22) Filed: May 15, 2020

(65) Prior Publication Data

US 2021/0357421 A1    Nov. 18, 2021

(51) Int. Cl.
  *G06F 16/25* (2019.01)
  *G06F 16/16* (2019.01)
  *G06F 16/22* (2019.01)
  *G06F 16/28* (2019.01)

(52) U.S. Cl.
  CPC .......... *G06F 16/254* (2019.01); *G06F 16/164* (2019.01); *G06F 16/221* (2019.01); *G06F 16/283* (2019.01)

(58) Field of Classification Search
  CPC .... G06F 16/254; G06F 16/164; G06F 16/221; G06F 16/283
  See application file for complete search history.

(56) References Cited

U.S. PATENT DOCUMENTS

| | | | |
|---|---|---|---|
| 9,361,337 B1* | 6/2016 | Bhave | G06F 16/2477 |
| 2017/0262508 A1* | 9/2017 | Garcia | H04L 43/10 |
| 2019/0147331 A1* | 5/2019 | Arditi | G05D 1/0274 |
| | | | 706/20 |
| 2019/0266165 A1* | 8/2019 | Yamato | G06F 16/248 |
| 2020/0042240 A1* | 2/2020 | Therene | G06F 3/068 |
| 2020/0175451 A1* | 6/2020 | Powers | G06F 3/048 |
| 2021/0165402 A1* | 6/2021 | Roeglinger | G05B 19/4183 |

* cited by examiner

*Primary Examiner* — Dangelino N Gortayo
(74) *Attorney, Agent, or Firm* — Kowert, Hood, Munyon, Rankin & Goetzel P.C.; Jeffrey C. Hood; Luke Langsjoen

(57) ABSTRACT

A method to dynamically analyze measurement data comprising measurement data sets as the measurement data is received and moved to a data warehouse. The program instructions may receive the measurement data and may extract first metadata from the measurement data. The program instructions may then extract and analyze measurement data points in the measurement data to determine if the measurement data points meet a first criteria and generate second metadata in response to determining that the measurement data points meet the first criteria. The program instructions may then provide the measurement data points, the first metadata and the second metadata to a data warehouse for storage. The analysis of the measurement data and creation of new metadata may be performed dynamically as the data is acquired and stored in the data warehouse.

18 Claims, 12 Drawing Sheets

Metadata Table

| Property Time | Property 1 | Property 2 | Property 3 | Property 4 | Property n | Data Set ID |
|---|---|---|---|---|---|---|
| Mon Jul 29 06:10:15 2019 | 0 | 255456 | 1 | Voltage | 0.344 | 2652328706068634821248901186 |
| Mon Jul 29 06:11:10 2019 | 1 | 2 | 1 | Voltage | 0.3455 | 2652328706068634821248901132 |
| Mon Jul 29 06:12:01 2019 | 2 | 946 | 3 | Voltage | 0.2994 | 2652328706068634821248902346 |
| ... | | | | | | ... |

FIG. 5A

Measurement Data Table

| Property Time | Data Set ID | Measurement Datapoints | Data Set Index |
|---|---|---|---|
| Mon Jul 29 06:10:15 2019 | 2652328706068634821248901186 | 0.00234 | 0 |
| Mon Jul 29 06:10:15 2019 | 2652328706068634821248901186 | 0.0034 | 2 |
| Mon Jul 29 06:10:15 2019 | 2652328706068634821248901186 | 0.00234 | 3 |
| ... | | | |

FIG. 5B

Augmented Metadata Table
*(includes Metadata corresponding to original measurement data sets only)*

| Property Time | Property 1 | Property 2 | Property 3 | Property 4 | Property n | Data Set ID | Data Set Points of Interest |
|---|---|---|---|---|---|---|---|
| Mon Jul 29 06:10:15 2019 | 0 | 255456 | 1 | Voltage | 0.344 | 26523287060686348212489 0186 | [234, 456, 456, 777, 9832] |
| Mon Jul 29 06:11:10 2019 | 1 | 2 | 1 | Voltage | 0.3455 | 26523287060686348212489 0132 | [1-4, 6-12, 90-45] |
| Mon Jul 29 06:12:01 2019 | 2 | 946 | 3 | Voltage | 0.2994 | 26523287060686348212489 2346 | [444490, 444499, 595900] |
| ... | ... | ... | ... | ... | ... | ... | ... |

FIG. 6

Augmented Metadata Table
*(Including Metadata corresponding to original measurement data sets and Metadata corresponding to new measurement data subsets)*

| Property Time | Property 1 | Property 2 | Property 3 | Property 4 | Property n | Data Set ID | Data Set Points of Interest | Index Range in Raw Data | Count |
|---|---|---|---|---|---|---|---|---|---|
| Mon Jul 29 06:10:15 2019 | 0 | 255456 | 1 | Voltage | 0.344 | 2652328706068634821248 90186 | [234, 456, 456, 777, 9832] | | |
| Mon Jul 29 06:11:10 2019 | 1 | 2 | 1 | Voltage | 0.3455 | 2652328706068634821248 90132 | [1-4, 6-12, 90-45] | | |
| Mon Jul 29 06:12:01 2019 | 2 | 946 | 3 | Voltage | 0.2994 | 2652328706068634821248 92346 | [444490, 444499, 595900] | | |
| ... | | | | | | ... | ... | | |
| Mon Aug 10 02:12:01 2019 | | | | | | 2752328346068638921248 92346 | | 56788-23456 | 45 |
| Mon Aug 10 02:13:01 2019 | | | | | | 2852328445686489212484 5346 | | 1-3567 | 124 |

FIG. 7A

Augmented Measurement Data Table
*(including original measurement data sets and new measurement data subsets)*

| Property Time | Data Set ID | Measurement Datapoints | Data Set Index |
|---|---|---|---|
| Mon Jul 29 06:10:15 2019 | 26523287060686348212489018 6 | 0.00234 | 0 |
| Mon Jul 29 06:10:15 2019 | 26523287060686348212489018 6 | 0.0034 | 2 |
| Mon Jul 29 06:10:15 2019 | 26523287060686348212489018 6 | 0.00234 | 3 |
| ... | ... | ... | ... |
| Mon Jul 29 06:10:15 2019 | 27523283460686389212489234 6 | 0.0042 | 2 |
| Mon Jul 29 06:10:15 2019 | 27523283460686389212489234 6 | 0.00573 | 4 |

FIG. 7B

DYNAMIC METADATA EXTRACTION WORKFLOW FOR MEASUREMENT DATA STORAGE

FIELD OF THE INVENTION

The present invention relates to the field of measurement and data storage, and more particularly to an improved method of measurement data storage and retrieval.

DESCRIPTION OF THE RELATED ART

In many test, measurement or industrial applications (and others), measurement devices (also called instruments) collect data or information from an environment or unit under test (UUT), and may also analyze and process acquired data. Examples of measurement devices include oscilloscopes, digital multimeters, pressure sensors, arbitrary waveform generators, digital waveform generators, etc. The information that may be collected by respective measurement devices or instruments includes information describing voltage, resistance, distance, velocity, pressure, oscillation frequency, humidity, and/or temperature, among others.

Measurement data that is generated when performing various types of tests, including simulations or validation tests, may comprise a variety of types, such as images, video, audio, temperature, pressure, etc. As one example, the measurement data may be of a waveform type, e.g., may depict one or more signals that are aperiodic, quasi-periodic or periodic in nature. Such measurement data signals can be time or frequency-based and comprise hundreds, thousands, or in many cases, millions of data points. There are many different file-formats in which these measurements are saved, such as CSV, HDF5, MDF, TDMS and CAN-bus logs.

Analyzing sets of measurement data has traditionally been very time-consuming, especially when the number of data sets is very large and when the amount of data under analysis is in the order of terabytes, petabytes or exabytes. Systems and methods of the prior art have required the time-consuming process of transferring all of the associated data files into a data lake prior to analysis. Once transferred, the data files required filtering and parsing, demanding still more time. As new technology testing applications (such as Autonomous Driving (AD) and Advance Driver Assist Systems (ADAS)) which process huge amounts of data have been developed, the demand for faster data analysis tools has increased. It is desirable to develop systems and methods to enable a test application to spend less compute time on storing, filtering and parsing files to allow for more time to be spent on file analysis. Therefore, improvements in the field are desired.

SUMMARY OF THE INVENTION

Various embodiments are presented herein of a system and method for dynamically analyzing measurement data and dynamically creating and storing new metadata during the storage process. Embodiments may also relate to dynamically creating new sets or groups of measurement data, as well as associated metadata, during the storage process. Embodiments presented herein also provide for a non-transitory computer-readable memory medium comprising program instructions that may execute the operations described herein.

A non-transitory computer readable memory medium may comprise program instructions that are executable to dynamically analyze measurement data comprising measurement data sets as the measurement data is received and moved to a data warehouse. The program instructions may receive the measurement data and may extract first metadata from the measurement data. The program instructions may then extract and analyze measurement data points in the measurement data to determine if the measurement data points meet a first criteria and generate second metadata in response to determining that the measurement data points meet the first criteria. The program instructions may then provide the measurement data points, the first metadata and the second metadata to a data warehouse for storage.

The program instructions may be executable to extract and analyze the measurement data points, generate the second metadata, and provide the measurement data points, the first metadata (if any) and the second metadata to the data warehouse dynamically as the measurement data is received and moved to the data warehouse. Stated another way, the program instructions may be executable to extract and analyze the measurement data points, generate the second metadata, and provide the measurement data points, the first metadata (if any) and the second metadata to the data warehouse as a single process without intervening permanent storage of the measurement data.

The measurement data may be received as files from a first storage, such as a data lake or a portable data store. Alternatively, the measurement data may be received directly from measurement devices. User input may be received specifying the first criteria prior to determining if the measurement data points meet the first criteria.

The program instructions may be further executable to identify measurement data subsets and to dynamically provide an identification of the measurement data subsets to the data warehouse. The measurement data subsets may be identified based on analysis of the measurement data sets relative to a second criteria. User input may be received specifying the second criteria prior to determining if the measurement data points meet the second criteria.

A system is described herein for dynamically analyzing measurement data as the measurement data is received and moved to a data warehouse. The received measurement data may comprise measurement data sets.

The system may comprise a file ingestion logic module coupled to a streaming module. The file ingestion logic module may be configured to receive the measurement data, extract measurement data points based on information in the measurement data, extract first metadata from the measurement data and provide the measurement data points and the first metadata. The file ingestion logic may use an event-based model to communicate the availability of measurement data and associated metadata. The streaming module may be configured to receive the measurement data points and the first metadata from the file ingestion logic module, analyze the measurement data points relative to a first criteria to generate second metadata based on the analysis, and provide the measurement data points, the first metadata and the second metadata to the data warehouse for storage. The streaming module may operate to extract and analyze the measurement data points, generate the second metadata, and provide the measurement data points, the first metadata (if any) and the second metadata to the data warehouse dynamically as the measurement data is received and moved to the data warehouse. The streaming module may also use an event-based model for communicating with storage software that actually transfers or writes the measurement data and the first and second metadata to the data warehouse.

The measurement data may be received as files from a first storage, such as a data lake or a portable data store. Alternatively, the measurement data may be received directly from measurement devices. Further, user input may be received specifying the first criteria prior to determining if the measurement data points meet the first criteria.

The system may be further configured to identify measurement data subsets and to dynamically provide an identification of the measurement data subsets to the data warehouse. The measurement data subsets may be identified based on analysis of the measurement data sets relative to a second criteria. The program instructions may be further executable to receive user input specifying the second criteria prior to determining if the measurement data points meet the second criteria.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which:

FIGS. 5A and 5B show a metadata table and a corresponding measurement data table according to the measurement data model described herein;

FIG. 6 shows a first augmented metadata table according to the measurement data model described herein.

FIGS. 7A and 7B show an augmented measurement data table and a corresponding second augmented metadata table according to the measurement data model described herein;

Figure 1:
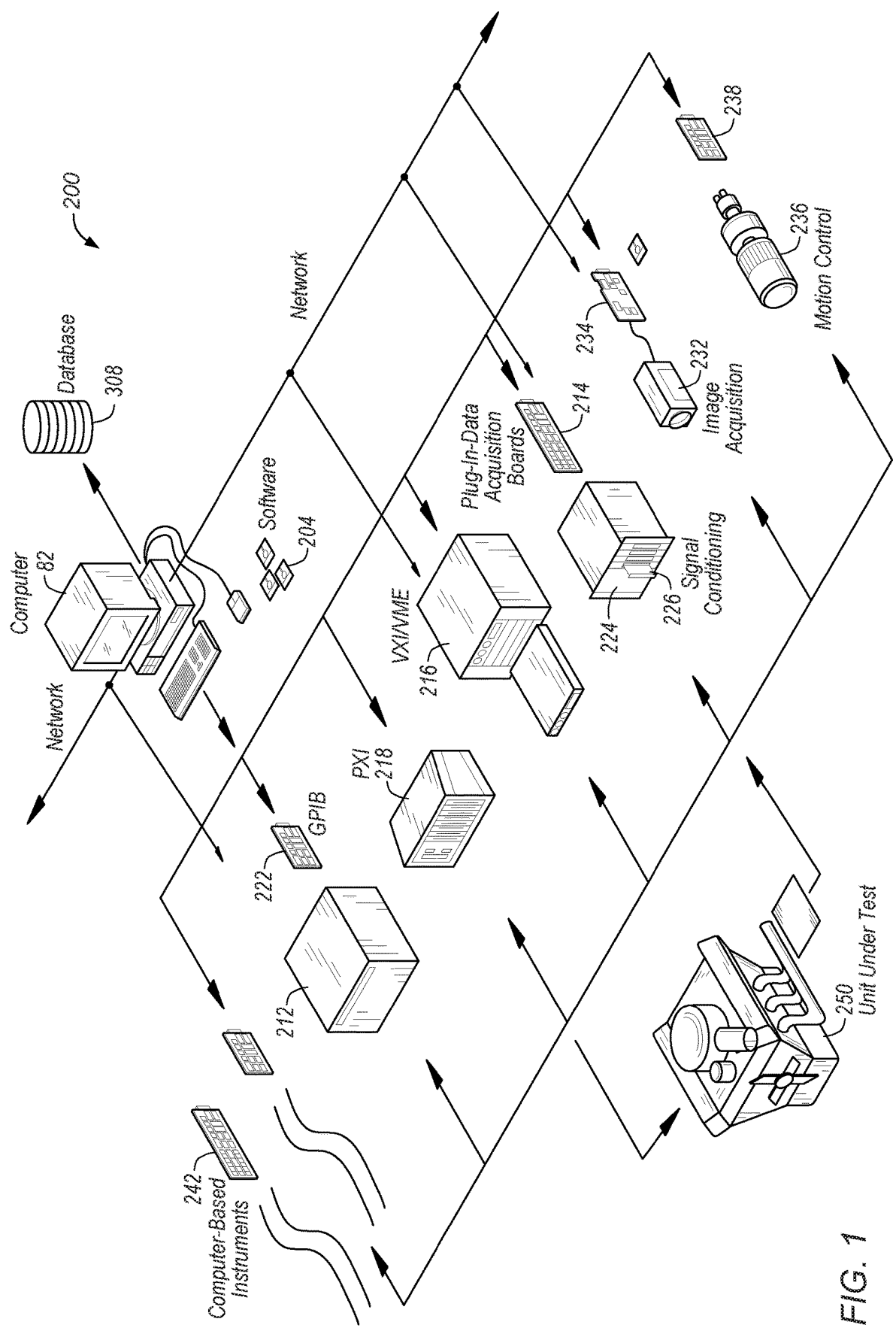
FIG. 1 shows an instrumentation/measurement system for acquiring measurement data according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms that may appear in the present disclosure:

Database—An organized collection of data, generally stored and accessed electronically from a computer system.

Column-Oriented Database—A database that stores data tables by column rather than by row. Column-oriented databases are data warehouses designed for online analytic processing (OLAP) use, and can provide data analysis using far fewer processing resources than would be required by a row-oriented database. Column-oriented databases allow more efficient data compression than row-oriented databases. Examples of column-oriented databases include Big Query, Druid and Amazon RedShift.

Data Warehouse—a central repository of integrated data from one or more disparate sources. A Data Warehouse may comprise one or more databases.

Data Lake—a system or repository of data wherein the data is stored in its natural or raw format, such as a file format.

Data Set—a collection of values relating to a particular subject. For example, a measurement data set may refer to a collection of data that was measured or acquired by a measurement device, such as an instrument or sensor.

Measurement Data—the term "measurement data has the full extent of its ordinary meaning and includes data that is acquired or generated in response to a measurement. Measurement data is typically generated by sensors or instruments which measure some type of real-world phenomena, such as pressure, temperature, vibrations, images, video, audio, voltage, current, resistance, etc.

Waveform—a signal representing a data set having a periodic or quasi-periodic nature.

Graphical User Interface (GUI)—is a form of user interface that allows users to interact with electronic devices through graphical icons.

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry—that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Example Measurement/Storage System

FIG. 1 illustrates an example instrumentation/measurement system 200 which may be configured to acquire measurement data and store it according to embodiments described herein. System 200 comprises a host computer 82 which may couple to one or more measurement devices (or instruments) configured to perform measurement or data acquisition of a unit under test (UUT) 250. Host computer 82 may comprise a CPU, a display screen, memory, and one or more input devices such as a mouse or keyboard as shown. Computer 82 may operate with one or more measurement devices (instruments) to analyze, measure, or control the unit under test (UUT) or process 250. The one or more measurement devices may include a GPM instrument 212 and associated GPIB interface card 222, a data acquisition board 214 inserted into or otherwise coupled with chassis 224 with associated signal conditioning circuitry 226, a VXI instrument 216, a PXI instrument 218, a video device or camera 232 and associated image acquisition (or machine vision) card 234, a motion control device 236 and associated motion control interface card 238, and/or one or more computer based instrument cards 242, among other types of devices.

The computer system 82 may couple to and operate with one or more of these measurement devices. In some embodiments, the computer system may be coupled to one or more of these measurement devices via a network connection, such as a Wireless Local Area Network (WLAN) connection or the Internet, for example, which may facilitate running a high-level synchronization protocol between the computer system and the coupled instruments. System 200 may be used in a data acquisition and control applications, in a test and measurement application, an image processing or machine vision application, a process control application, a man-machine interface application, a simulation application, or a hardware-in-the-loop validation application, among others.

Embodiments of the measurement system may operate to acquire measurement data or data of a measurement data type. The measurement system may be used in applications which involve the acquisition of measurement data having a large number of data points, e.g., the acquisition of large data sets of measurement data. Examples of such data acquisition applications include new machine learning-based test applications which process very large amounts of data to test new technologies such as Autonomous Driving (AD) and Advance Driver Assist Systems (ADAS). Thus, as one example embodiment one or more measurement devices or sensors may be configured to acquire data in an autonomous driving scenario, including data such as still images, video, vibrations, temperature, etc. and provide this for more efficient storage in a data warehouse as described herein.

The computer system 82 may be coupled to a database 308, such as a data warehouse. The computer may provide metadata of the acquired measurement data, as well as the measurement data itself, to the data warehouse 308, where the metadata and measurement data may be stored in a column-oriented format. In some embodiments, one or both of the computer system 82 and the data warehouse 308 may store and/or execute program instructions for dynamically analyzing the measurement data and dynamically creating and storing new metadata for the measurement data while storing the measurement data in the data warehouse. The data warehouse 308 may be configured as a non-transitory computer-readable memory medium, or as a plurality of such memory mediums, e.g., as a cloud storage solution. For example, the data warehouse 308 may comprise a plurality of storage computer systems configured to collectively operate as storage for the data warehouse 308.

Figure 2:
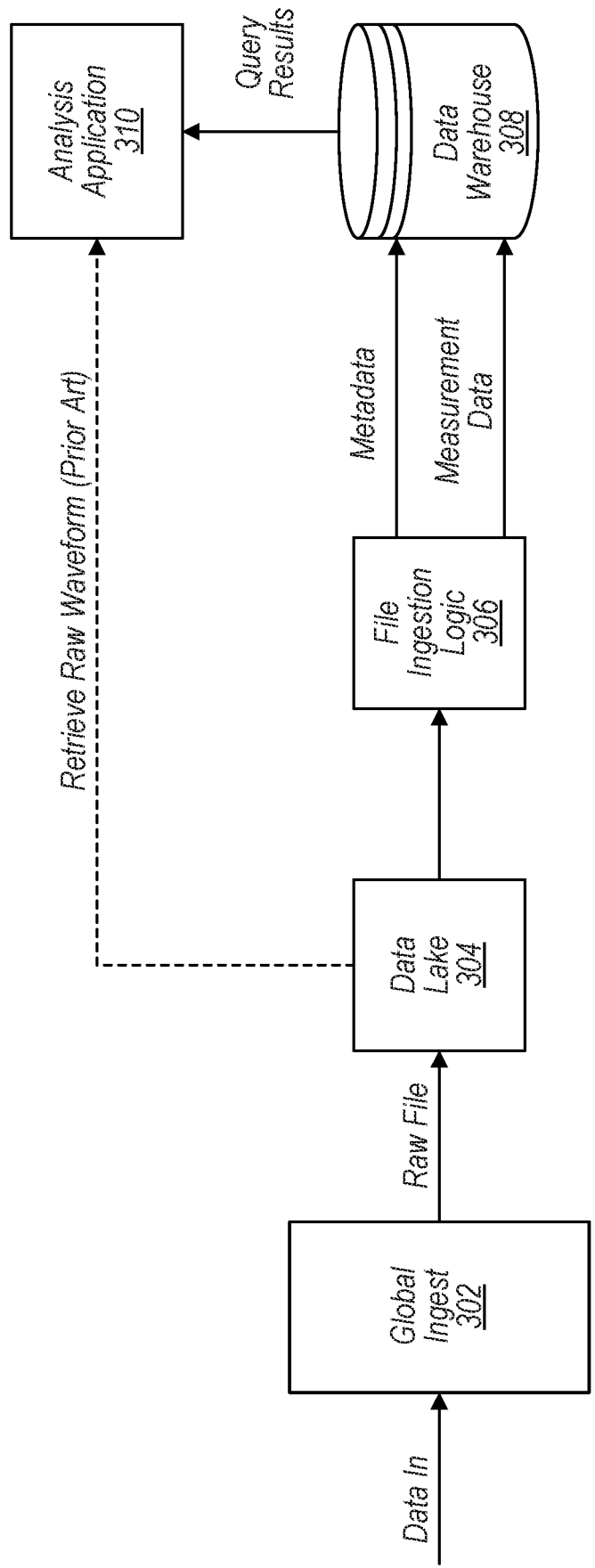
FIG. 2 shows a data management platform for processing, storing and analyzing measurement data according to the measurement data model described herein.

FIG. 2—Data Management Platform

FIG. 2 depicts a data management platform that may be used in test and measurement (T&M) applications as described in related U.S. application Ser. No. 16/875,566 titled "Data Model for Measurement Data Storage in Databases", whose inventor is Sundeep Chandhoke, and which is hereby incorporated by reference in its entirety as though fully and completely set forth herein. The raw data, Data In (files containing the measurement data) may be ingested into (or received by) the data platform, through Global Ingest 302, and may be stored in a Data Lake 304. The term "Data Lake" refers to a system or repository of data wherein the data is stored in its natural or raw format, such as a file format. This raw data may have been acquired from a measurement system. Global Ingest 302 is an application that performs the function of managing ingress of data, such as information stored in files or events generated by test and measurement systems. Typical implementations of Global Ingest perform the functions of verifying the validity of the data (data governance), augmenting the data with information, such as source and ingress time, to help find the files in the data lake, copying the data into the data lake, and triggering a File Ingestion Logic 306 application to parse the data and to write it to a Data Warehouse 308.

The File Ingestion Logic application 306 may read the raw data or files from this Data Lake 304 and extract metadata from this raw data (metadata that is stored within the raw data or files) which describe the measurement data and the test and measurement procedures. The metadata that is extracted from the raw data or files may comprise metadata that was known and/or created at or around the time the data was generated or acquired, such as the type of instrument used to acquire the data, the operator of the measurement system during the acquisition, the time of acquisition, etc. The File Ingestion Logic 306 may then write this metadata into at least one metadata table that is defined in a Data Warehouse 308.

In prior art implementations, the pre-existing metadata is stored in the data warehouse but the measurement data itself is maintained as raw data in the data lake. As a result, prior art analysis software performs queries using the metadata in the data warehouse, and based on information gathered from the metadata, reads the raw files from the data lake into memory, consuming significant disk space. The analysis software then filters and parses the raw files to analyze the measurement data contained therein. The filtering and parsing of the raw files by the analysis software becomes increasingly compute time intensive as the number of files in the data lake increases.

U.S. application Ser. No. 16/875,566 referenced above describes a method whereby the measurement data is stored in the data warehouse along with the pre-existing metadata. This allows for more efficient querying and analysis of the measurement data. However, the metadata that is stored in the data warehouse is limited to the pre-existing metadata which was provided with the measurement data. Therefore, improvements in the field are desired.

Data Management Platform with Dynamic Data Analysis

Figure 3:
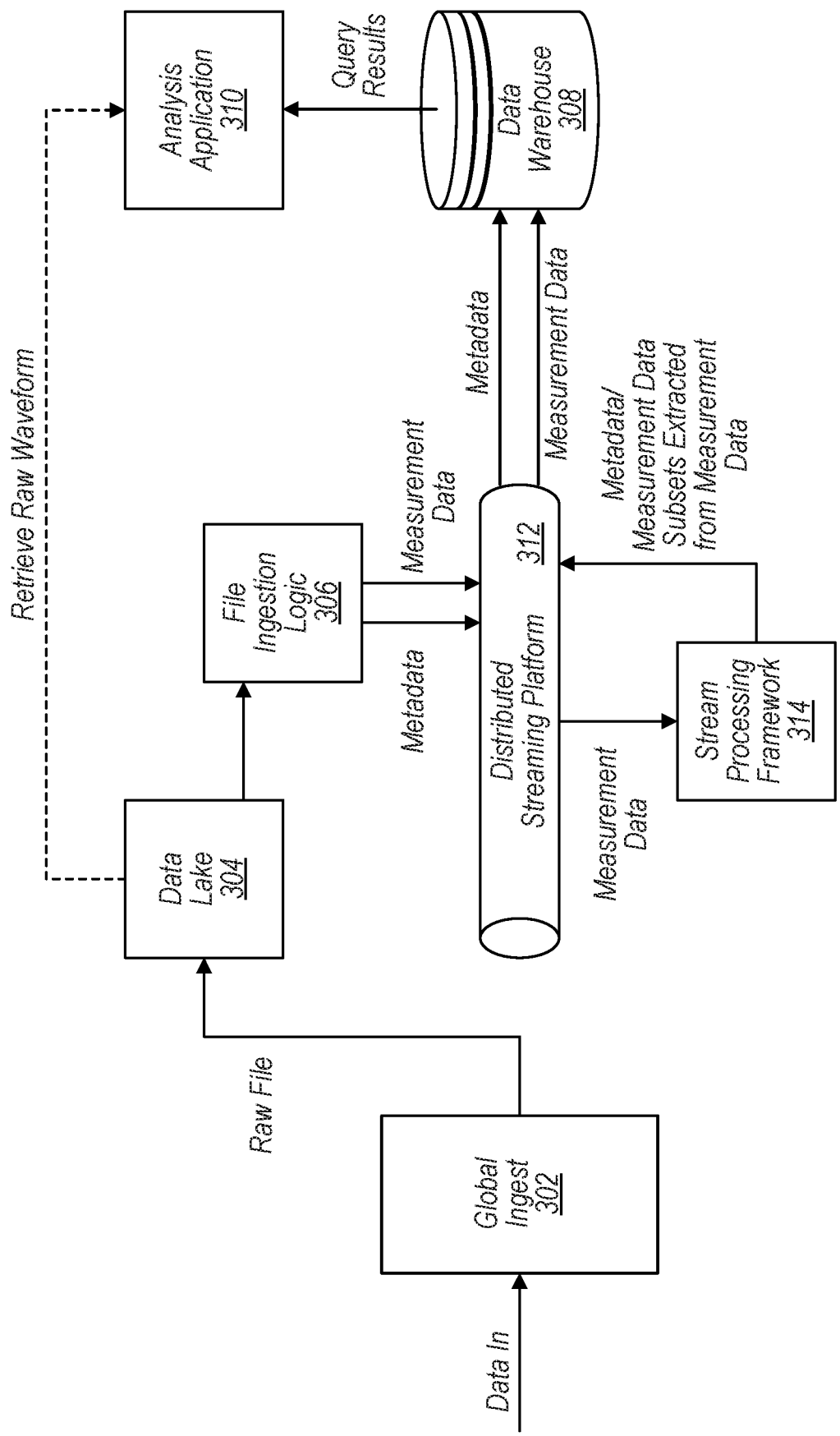
FIG. 3 shows a data management platform for enabling a dynamic measurement information extraction workflow according to the measurement data model described herein.

FIG. 3 illustrates an architecture for a data management platform for enabling the workflow of extracting information of "data sets-in-motion" that may be used in any of various test and measurement (T&M) applications. This architecture augments the data platform of FIG. 2 with a Distributed Streaming Platform 312 and a Stream Processor Framework 314 to allow for the dynamic creation of metadata and storage of this metadata in the data warehouse.

Here we presume that a measurement system has been configured, such as that shown in FIG. 1. The measurement system may be designed to acquire large amount of measurement data from a unit under test. For example, the measurement system may be used to acquire data in conjunction with an Autonomous Driving (AD) System or Advanced Driver Assist System (ADAS).

As in FIG. 2, the raw data produced by the measurement system, Data In (files containing the measurement data), may be ingested into (or received by) the data platform, through Global Ingest 302, and may be stored in a Data Lake 304.

The File Ingestion Logic application 306 may read the raw data or files from the Data Lake 304 and may extract metadata (metadata that is stored within the raw data or files) which describe the measurement data and the test and measurement procedures. The metadata that is extracted from the raw data or files may comprise metadata that was known and/or created at or around the time the data was generated or acquired, such as the type of instrument used to acquire the data, the operator of the measurement system during the acquisition, the time of acquisition, etc. The File Ingestion Logic 306 may then write the metadata information into at least one table (the "first table") that is defined in a Data Warehouse 308. (e.g., database or data warehouse 308 of FIG. 1).

In one embodiment, the File Ingestion Logic 306 may also extract individual measurement data information from the raw data or files from the Data Lake 304. The File Ingestion Logic 306 may then write the individual measurement data information into at least one measurement data table (the "second table") that is defined in the Data Warehouse 308. An embodiment of this type is disclosed in concurrently filed U.S. Patent Application. titled "Data Model for Measurement Data Storage in Databases" referenced above.

Embodiments described herein may comprise the addition of a Distributed Streaming Framework 312 and a Stream Processor Framework 314. Improvements provided by the Distributed Streaming Framework 312 and the Stream Processor Framework 314 may comprise the ability to dynamically create new metadata and new corresponding metadata tables, and to dynamically identify new measurement data subsets and to dynamically create new corresponding measurement data tables.

For example, the File Ingestion Logic 306 may send the acquired metadata (the extracted metadata) to the Data Warehouse 308 (e.g. database or data warehouse 308 of FIG. 1). through the Distributed Streaming Platform 312 and the Stream Processing Framework 314. In one embodiment, this transfer may comprise the File Ingestion Logic 306 creating metadata events based on the data model for the Metadata Table of FIG. 5A and writing the metadata events to a metadata topic on the Distributed Streaming Platform 312. Here the term "metadata event" refers to the creation of new metadata, and may more specifically refer to a computer-generated indication (event) signifying that new metadata has been created. As used herein, a topic refers to a named stream of records. Thus, writing the metadata events to the metadata topic serves as a means to record or store information indicating or specifying the newly created metadata, and may also serve as a notification mechanism to other software components. The Distributed Streaming Platform 312 may then dynamically write the metadata events as rows to at least one metadata data table such as that shown in FIG. 5A, in a Data Warehouse 308 (e.g. database or data warehouse 308 of FIG. 1). This operates to store the metadata that was extracted from the measurement data files into tables in the data warehouse.

The File Ingestion Logic application 306 may also send the acquired measurement data to the Data Warehouse 308 through the Distributed Streaming Platform 312 and the Stream Processing Framework 314. The File Ingestion Logic 306 may create measurement data events based on the data model of the Measurement Data Table of FIG. 5B. The File Ingestion Logic 306 may then write each data point of each set of measurement data as a measurement data event to a measurement data topic on the Distributed Streaming Platform 312. The Distributed Streaming Platform 312 may then dynamically write the measurement data events to at least one measurement data table, such as that shown in FIG. 5B, in a Data Warehouse 308.

The Stream Processor Framework 314 may subscribe to the measurement data topic on the Distributed Streaming Platform 312. In this manner, the Stream Processor Framework 314 may be alerted when new metadata is created by the Distributed Streaming Platform. The Stream Processor Framework 314 may dynamically analyze the measurement data events based on predefined criteria. The predefined criteria may have been specified, for example, by an Analysis Application 310 (e.g., by a user of the Analysis Application 310) or by a user through a graphical user interface to the Stream Processor Framework 314. Some examples of the criteria may be: data points exceeding specified limits, abnormal patterns (comparisons with expected patterns) and statistics (minimum, maximum, period, amplitude, etc.).

Based on this analysis, the Stream Processor Framework 314 may dynamically generate new metadata that describe the measurement data. The new metadata may augment the metadata received by the File Ingestion Logic application 306. In other words, the new dynamically created metadata may augment the existing metadata that was present when the measurement data was first received, i.e., the new dynamically created metadata may augment the metadata that was extracted from the raw data or files and which was known and/or created at or around the time the data was generated or acquired. Using the new metadata, the Stream Processor Framework 314 may dynamically create new metadata events based on the data model of the Metadata Table of FIG. 5A and dynamically write the new metadata events to the metadata topic on the Distributed Streaming Platform 312. The Distributed Streaming Platform 312 may then dynamically write the new metadata to at least one metadata table, such as that shown in FIG. 6, in a Data Warehouse 308.

In one embodiment, the Stream Processor Framework 314 may also dynamically identify subsets of interest within the measurement data and dynamically create new measurement data events that define these measurement data subsets, based on the data model of the Measurement Data Table of FIG. 5B. The measurement data subsets of interest may be determined based on criteria from the user or from a software application. For example, the criteria may relate to regions or objects of interest detected in acquire video images. Thus, when the measurement data is an acquired video image, the image data may be analyzed dynamically and pixels of interest may be identified. As another example, the criteria may involve identifying a predetermined amount of measurement data after a trigger condition is detected, such as a measurement data point being above or below a threshold.

The Stream Processor Framework 314 may then dynamically write each data point of each subset of measurement data as an event to the measurement data topic of the Distributed Streaming Platform 312. Based on these events, the Distributed Streaming Platform 312 may then dynamically write the measurement data to at least one measurement data table, such as that shown in FIG. 7A, in a Data Warehouse 308.

In other words, the user (or a software application) may have previously configured new desired metadata types that are desired, or may have configured characteristics or criteria for which the user desires to identify matching measurement data. The Stream Processor Framework 314 may be configured to analyze the received measurement data dynamically, or "on-the-fly" as the data is being received from the measurement system and transferred for storage into the Data Warehouse 308. The Stream Processor Framework 314 may then be configured to generate or create new metadata and to identify subsets of measurement data dynamically, or "on-the-fly" or in "real-time" during this transfer and storage process. Thus, as the measurement data is being measured, or is being acquired from a memory such as the Data Lake or a portable data store (FIG. 8) the method described herein may operate to dynamically analyze the measurement data, identify subsets of the measurement data and create new metadata that is stored in one or more tables in the Data Warehouse 308. In other words, the dynamic analysis of the measurement data and creation of new metadata may be performed as a single continuous process without intervening permanent storage of the measurement data. This dynamic creation of new metadata and identification of subsets of measurement data operate to save considerable processing time later when analysis of the stored measurement data in the Data Warehouse 308 is desired.

Figure 4:
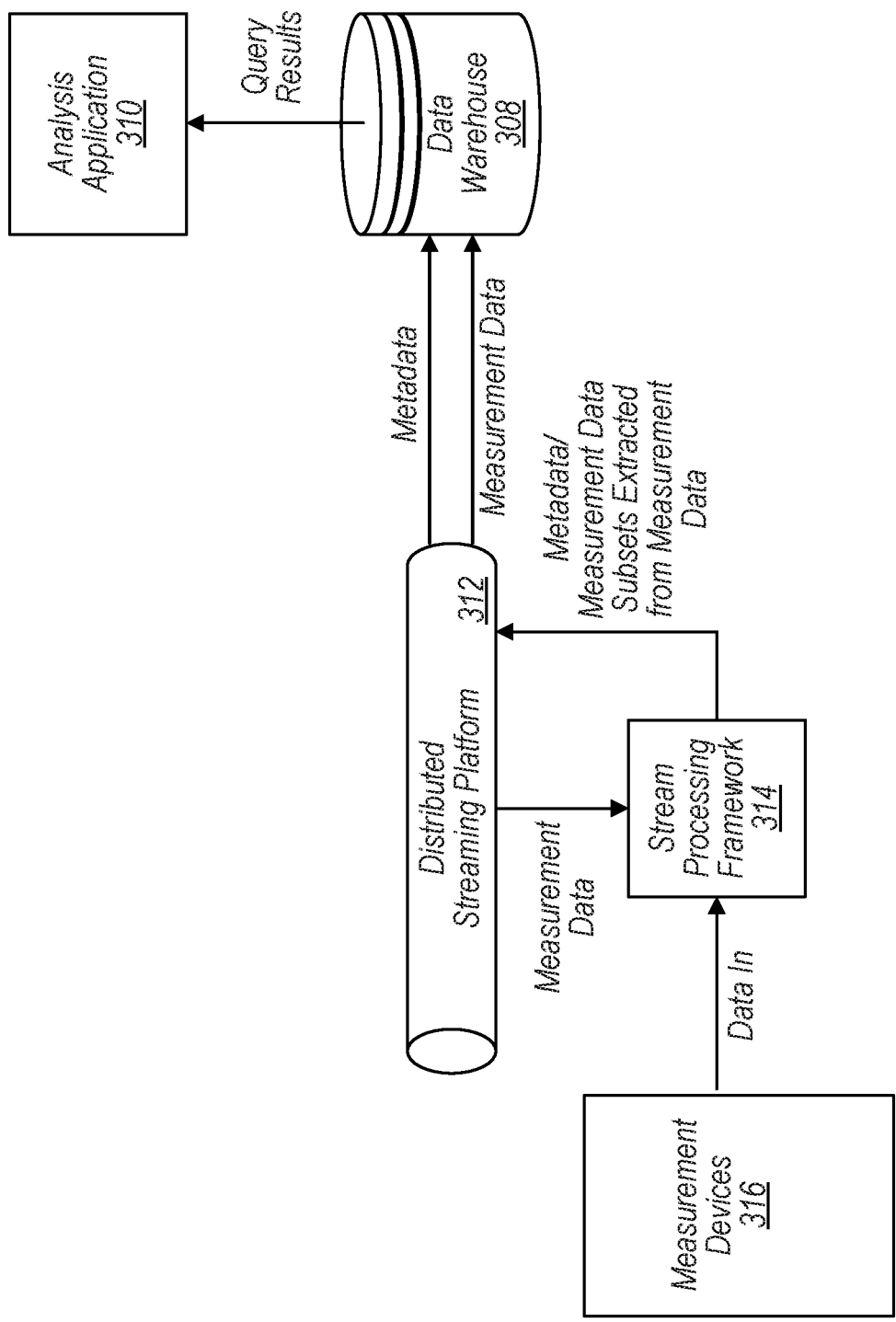
FIG. 4 shows a data management platform for enabling a dynamic measurement information extraction workflow according to the measurement data model described herein.

FIG. 4—Alternative Data Management Platform

FIG. 4 illustrates another embodiment of an architecture for a data management platform for enabling the workflow of extracting information of "data sets-in-motion" that may be used in any of various test and measurement (T&M) applications. In this embodiment, the data may be acquired from one or more measurement devices (such as those shown in FIG. 1) and provided directly to the data management platform. In this embodiment, Global Ingest 302, Data Lake 304 and File Ingestion Logic 306 of FIG. 3 may not be required.

In this embodiment, the raw data (Data In) is received by the Stream Processor Framework 314 directly from one or more measurement devices. In addition to actual measurement data, the raw data may also include associated metadata. For example, before (or during or after) the actual measurement, the one or more measurement devices may provide metadata, such as the type of instrument used to acquire the data, the operator of the measurement system during the acquisition, the time of acquisition, etc. Dynamically, (or "on-the-fly" or in "real time") as the data is received from the one or more measurement devices, the Stream Processor Framework 314 may extract metadata information from the raw data, create metadata events based on the raw data, and write each metadata event to a metadata topic on the Distributed Streaming Platform 312. In response to these metadata events, this pre-existing metadata may be written into at least one metadata table, (the "first table"), such as that shown in FIG. 5A, that is defined in, or is dynamically created in, the Data Warehouse 308.

The Stream Processor Framework 314 may also dynamically (or "on-the-fly" or in "real time") extract individual measurement data information from the raw data, create measurement events based on the raw data, and write each data point of each set of measurement data as a measurement data event to a measurement data topic on the Distributed Streaming Platform 312. In response to these measurement events, the measurement data may be written into at least one measurement data table (the "second table"), such as that shown in FIG. 5B, that is defined in, or is dynamically created in, the Data Warehouse 308. This allows measurement data to be acquired from one or more measurement devices or instruments and then dynamically (e.g., substantially immediately) written as events to the Distributed Streaming Platform 312 and stored as the second table in the Data Warehouse 308, without intermediate storage as files in the Data Lake 304.

The Stream Processor Framework 314 may also dynamically create new metadata events and new measurement data events (i.e., measurement data events corresponding to identified measurement data subsets) in accordance with the methods described above in reference to FIG. 3. As described in reference to FIG. 3, these new metadata events and new measurement data events may be dynamically written to the Distributed Streaming Platform 312 as events and then to one or more corresponding tables (such as those shown in FIGS. 7B and 7A) in a Data Warehouse 308.

Thus, in FIG. 4, the metadata is received from the one or more instruments or measurement devices and dynamically stored in the metadata table (first table) in the Data Warehouse 308 without intermediate storage in the Data Lake 304, or possibly only a very brief temporary storage in a buffer memory, such as a buffer. Similarly, the raw measurement data from the one or more instruments or measurement devices may be dynamically written, as the data is received, into one or more tables in the Data Warehouse 308 without intermediate storage in the Data Lake 304. Further, the raw measurement data may be dynamically analyzed upon receipt and as it is being transferred to the data warehouse, and new metadata may be created based on this analysis (e.g., based on certain criteria or characteristics of the data). This new metadata may be dynamically created and stored in the Data Warehouse during the overall measurement data acquisition and storage process. In addition, the method may identify subsets of the measurement data based on various criteria, and these identified subsets may be separately written into the data warehouse dynamically during the overall measurement data acquisition and storage process.

FIGS. 5A and 5B—Metadata and Measurement Data Tables

FIG. 5A illustrates a Metadata Table (first table) and FIG. 5B illustrates a corresponding Measurement Data Table (second table) in accordance with one embodiment of the present invention. The Metadata Table in FIG. 5A comprises columns which each store a type of metadata describing information about the sets of measurement data; for example, sampling interval, units, sensor information, time of acquisition, location of acquisition, threshold comparison, etc. The Measurement Data Table in FIG. 5B comprises columns which store the measurement data. These tables are described further below.

As noted above, both the Metadata Table and the Measurement Data Table may be stored in a data warehouse (e.g. database or data warehouse 308 of FIG. 1). In one embodiment, each row in the Metadata Table corresponds to one metadata event as written to the Metadata Topic on the Distributed Streaming Platform 312. Likewise, in one embodiment, each row in the Measurement Data Table corresponds to one measurement data event as written to the Measurement Data Topic on the Distributed Streaming Platform 312.

In FIG. 5A the metadata columns are labeled Property 1, Property 2, . . . Property n, as well as Property Time. One of the columns in this table stores an identification (ID) that serves as a unique identifier of the measurement data set the metadata describes. This unique identifier is referred to as a Data Set ID. The inclusion of a Data Set ID in the Metadata Table operates to create a "tie" or "link" to the corresponding data points stored in the new Measurement Data Table. The Metadata Table may also have other columns as well. In this example figure, the Metadata Table may only comprise metadata information that was initially acquired from the raw data in the Data Lake 304 or directly from the one or more measurement devices. Each row in the Metadata Table may correspond to one metadata event as written to the Metadata Topic on the Distributed Streaming Platform 312. Stated another way, each row in the Metadata Table may correspond to an instance of metadata that corresponds to a measurement data point in the Measurement Table.

The Measurement Data Table (FIG. 5B) stores the actual measurement data. In this table, each point of the measurement data is distinctly identified in a Datapoints column, which allows information corresponding to each particular datapoint to be stored in the same row. Each datapoint (row) of a common set of measurement data may have the same Data Set ID. The Measurement Data Table may comprise measurement data information that was initially acquired from the raw data in the Data Lake 304 or directly from the one or more measurement devices. Each row in the Measurement Data Table corresponds to one measurement data event as written to the measurement data topic on the Distributed Streaming Platform 312.

In one embodiment, the Measurement Data Table comprises at least two columns corresponding to the Datapoints column. The first of these is the Data Set ID column. The Data Set ID column identifies the set of measurement data to which each data point belongs, and serves as a "lookup index" that connects this set of measurement data to the Data Set ID column in the Metadata Table. This Data Set ID connects or associates the measurement data to its associated metadata that is stored in the Metadata Table. The second of these is the Data Set Index column. The Data Set Index column describes the ordering of measurement data points in their corresponding set of measurement data. The values in the Data Set Index column enable reordering of the measurement data upon retrieval. The Measurement Data Table may also have a Property Time column as well, indicating the time the measurement data point was acquired. The Measurement Data Table may also have other columns as well.

When a query is submitted (by the Analysis Application, the Stream Processor Framework, or another interface) to the Data Warehouse 308, the query will typically involve a query of a specific range, type or characteristic of metadata stored in the Metadata Table. This query may be used to identify one or more rows of the Metadata Table that satisfy the query. The Data Set ID can then be obtained from these identified rows in the Metadata Table and used to access the corresponding measurement data points in the Measurement Data Table that have the same (or corresponding) Data Set ID. For example, in one embodiment one or more Data Set IDs are returned in response to the query, and these returned Data Set IDs can be used to create a second query for the associated measurement data that corresponds to these Data Set IDs. Alternatively, the identified Data Set IDs can be used by software to automatically retrieve the appropriate measurement data from the Measurement Data Table.

In this way the Data Set ID stored in the Metadata Table is used to locate or access the measurement datapoints corresponding to this identified metadata. These measurement datapoints can then be accessed or retrieved from the Data Warehouse 308. As noted above, the measurement data may be stored in a columnar format in the second table in the Data Warehouse 308. Thus, the measurement data can be accesses more efficiently, using less compute and memory resources, than prior techniques. This provides a significant improvement over prior methods where the data points are stored in a raw format in the data lake.

The following describes an example query that may be created by a user and used to acquire the Data Set ID of a set of measurement which meets certain desired characteristics.

For example, the following query
query=(
"SELECT DISTINCT Data Set ID"
"FROM"+""+table1+""
"WHERE Property 1<=0 AND Property 2>1000")
) would return:
Data Set ID=265232870306863482124890186
corresponding to the value of the Data Set ID in the first row of the Metadata Table (FIG. 5A).

The following is an example of a query that may be used to easily retrieve all of the data points of a set of measurement data corresponding to a particular Data Set ID, in this case, Data Set ID 26523287030686348212489O186:

query=(
"SELECT Data Set Datapoints"
"FROM"+""""+table2+""""
"WHERE Data Set ID=26523287030686348212489O186"
)

The following is a 2-query mechanism which combines the queries above.

query=(
"SELECT Data Set Datapoints, Data Set Index"
"FROM"+""""+table2+""""
" WHERE Data Set ID=26523287030686348212489O186
"OR" WHERE Data Set ID=26523287030686348212489O132 AND Data Set Datapoints>0.034 AND Data Set Datapoints<=0.05")
)

Through this mechanism, multiple entire measurement data sets or subsets of such datasets may be retrieved. Multiple measurement data sets which need to analyzed on the basis of common characteristics may be queried in this manner, returning a subset of two measurement data sets with their corresponding index values which may then be further analyzed.

Consistent with the data model illustrated by FIG. 3, each row in FIG. 5A may correspond to one event on the metadata topic in the Data Warehouse 308 and each row in FIG. 5B may correspond to one event on the measurement data topic in the Data Warehouse 308. In some embodiments there may be multiple instances of FIG. 5A and FIG. 5B for holding metadata and measurement data events from files containing T&M information from different types of tests.

FIG. 6—Augmented Metadata Table

FIG. 6 shows an Augmented Metadata Table in accordance with one embodiment of the dynamic analysis methods defined herein. Each row entry of the Augmented Metadata Table of FIG. 6 may correspond to a new metadata event as written to the Metadata Topic on the Distributed Streaming Platform 312. In other words, in the Augmented Metadata Table of FIG. 6, the method has dynamically analyzed received measurement data and dynamically created new metadata, wherein this dynamically created new metadata "augments" (or is in addition to) the pre-existing metadata that was received with the measurement data. The Augmented Data Table may be stored in a Data Warehouse 308 (e.g. database or data warehouse 308 of FIG. 1).

In the present embodiment, the columns labelled Properties 1-n may correspond to metadata that was initially received by File Ingestion Logic 306 or by Stream Processor Framework 314 (from the raw data or files in the Data Lake 304 or directly from the one or more measurement devices) and thus correspond to the columns of FIG. 5A. Examples of this metadata may comprise the type of instrument used to acquire the data, the operator of the measurement system during the acquisition, and time of the acquisition. Thus Properties 1-n correspond to pre-existing metadata that was received along with the original measurement data.

The highlighted column labeled "Data Points of Interest" corresponds to an example of new metadata that was subsequently dynamically created by the Stream Processor Framework 314 during the acquisition and storage process. As stated previously, during transfer and storage of the measurement data (and any associated metadata) into the Data Warehouse 308, the Stream Processor Framework 314 may dynamically generate new metadata based on an analysis of the measurement data (or measurement data events) (FIG. 4B). The Stream Processor Framework may then dynamically create new metadata events based on this new metadata. The new metadata events may then cause this new metadata to be written to at least one augmented metadata table (FIG. 6) in a Data Warehouse 308 (e.g. database or data warehouse 308 of FIG. 1). The Augmented Data Table may comprise one or more new columns. Examples of this new metadata may comprise data points exceeding specified limits, abnormal patterns (comparisons with expected patterns), and statistics (minimum, maximum, period, amplitude, etc.).

FIGS. 7A and 7B—Augmented Metadata and Measurement Data Tables

FIG. 7A illustrates an Augmented Metadata Table (including measure metadata corresponding to original data sets and metadata corresponding to new data subsets) and FIG. 7B illustrates a corresponding Augmented Measurement Data Table in accordance with one embodiment of the present invention. The Augmented Metadata Table may comprise a plurality of columns, where a first one or more columns may correspond to metadata relating to a pre-existing or original set of measurement data, and a second one or more columns may correspond to metadata relating to newly created measurement data subsets, as described herein. Accordingly, each row entry of the Augmented Metadata Table may include both pre-existing metadata and newly created metadata (dynamically created metadata). Stated another way, the Augmented Metadata Table may include at least one new metadata event as written to the Metadata Topic on the Distributed Streaming Platform 312. The Augmented Metadata Table may include metadata corresponding to original data sets, new metadata created from the original data sets, and new metadata corresponding to new data subsets. The Augmented Metadata Table (including metadata corresponding to original data sets and metadata corresponding to new data subsets) and the Augmented Measurement Data Table may be stored in a Data Warehouse 308 (e.g. database or data warehouse 308 of FIG. 1).

As stated previously, during transfer and storage of the measurement data (and any associated metadata) into the Data Warehouse 308, the Stream Processor Framework 314 may dynamically analyze the measurement data events and identify data subsets of interest. The Stream Processor Framework 314 may create a unique "Data Set ID" corresponding to each identified new measurement data subset. The Stream Processor Framework 314 may then write each data point of each subset of measurement data as an event to the measurement data topic of the Distributed Streaming Platform 312. These events (measurement data subsets of interest) may then be written as rows to at least one table (e.g. Augmented Measurement Data Table, FIG. 7B) in the Data Warehouse 308. The Data Set ID field in each event (and in each row of the subsequently created Augmented Measurement Data Table in the database) associates each identified measurement data subset to its corresponding measurement data points. The Data Set Index field in each event (and in each row of the subsequently created Augmented Measurement Data Table in the database) identifies the ordering of measurement data points in their corresponding subset of measurement data, enabling reordering of the measurement data upon retrieval. The first rows of the Augmented Measurement Data Table, FIG. 7B, establish a correspondence between original measurement data sets and their corresponding measurement datapoints, and may therefore be identical to the rows of Measurement Data Table, FIG. 5B. Subsequent rows of the Augmented Measurement Data Table, FIG. 7B, may establish a correspondence between new measurement data subsets and their corresponding datapoints, as shown by the final two rows of FIG. 7B As stated previously, during transfer and storage of the measurement data (and any associated metadata) into the Data Warehouse 308, the Stream Processor Framework 314 may dynamically generate new metadata based on an analysis of the measurement data events (FIG. 4B). The Stream Processor Framework may then dynamically create new metadata events based on this new metadata and write these metadata events as rows to one or more tables in Data Warehouse 308 (e.g. database or data warehouse 308 of FIG. 1). FIG. 7A, Augmented Data Table (including metadata corresponding to original data sets and metadata corresponding to new data subsets), shows the creation of new metadata events with respect to new measurement data subsets. The first rows of the Augmented Metadata Table (including metadata corresponding to original data sets and metadata corresponding to new data subsets) show new metadata events corresponding to original measurement data sets (indicated by original Data Set IDs), and may therefore be identical to the rows of the Augmented Metadata Table of FIG. 6, and to the first rows of Augmented Measurement Data Table, FIG. 7B Subsequent rows of the Augmented Metadata Table (including metadata corresponding to original data sets and metadata corresponding to new data subsets), FIG. 7A, may comprise new metadata events with respect to new measurement data subsets (indicated by new Data Set IDs). These new measurement data subsets may be "linked" to their corresponding measurement data subset datapoints an Augmented Measurement Data Table through the common Data Set ID column.

The additional information provided by the Augmented Metadata Table (including metadata corresponding to original data sets and metadata corresponding to new data subsets) and the corresponding Augmented Measurement Data Table may reduce the amount of time needed by the Analysis Application 310 in comparison with the time needed by analysis applications of the prior art. The resulting reduction in analysis time may manifest as a reduction in computer processing time and/or a reduction in manual, human analysis time. The resulting reduction in time may be proportional to the amount of data being analyzed, and thus the embodiment may be of great benefit to applications which analyze very large amounts of data.

The following describes an example query that may be created by a user in order to search the Augmented Metadata Table (including measure metadata corresponding to original data sets and metadata corresponding to new data subsets) of FIG. 7A and corresponding Augmented Measurement Data Table of FIG. 7B.

query=(
  "SELECT DISTINCT Data Set ID, Index Range in Raw Data"
  "FROM"+""""+table1+""""
  "WHERE Count>12"
)
would return:
  Data Set ID=2752328346068638921248923 46, Index Range in Raw Data=56788:23456 and
  Data Set ID=2852328344568648921248453 46, Index Range in Raw Data=1:3567

Through this mechanism, multiple entire measurement data sets or subsets of such data sets may be retrieved. Multiple measurement data sets which need to analyzed on the basis of common characteristics may be queried in this manner, returning a subset of measurement data sets with their corresponding index ranges in raw data which may then be further analyzed.

Figure 8:
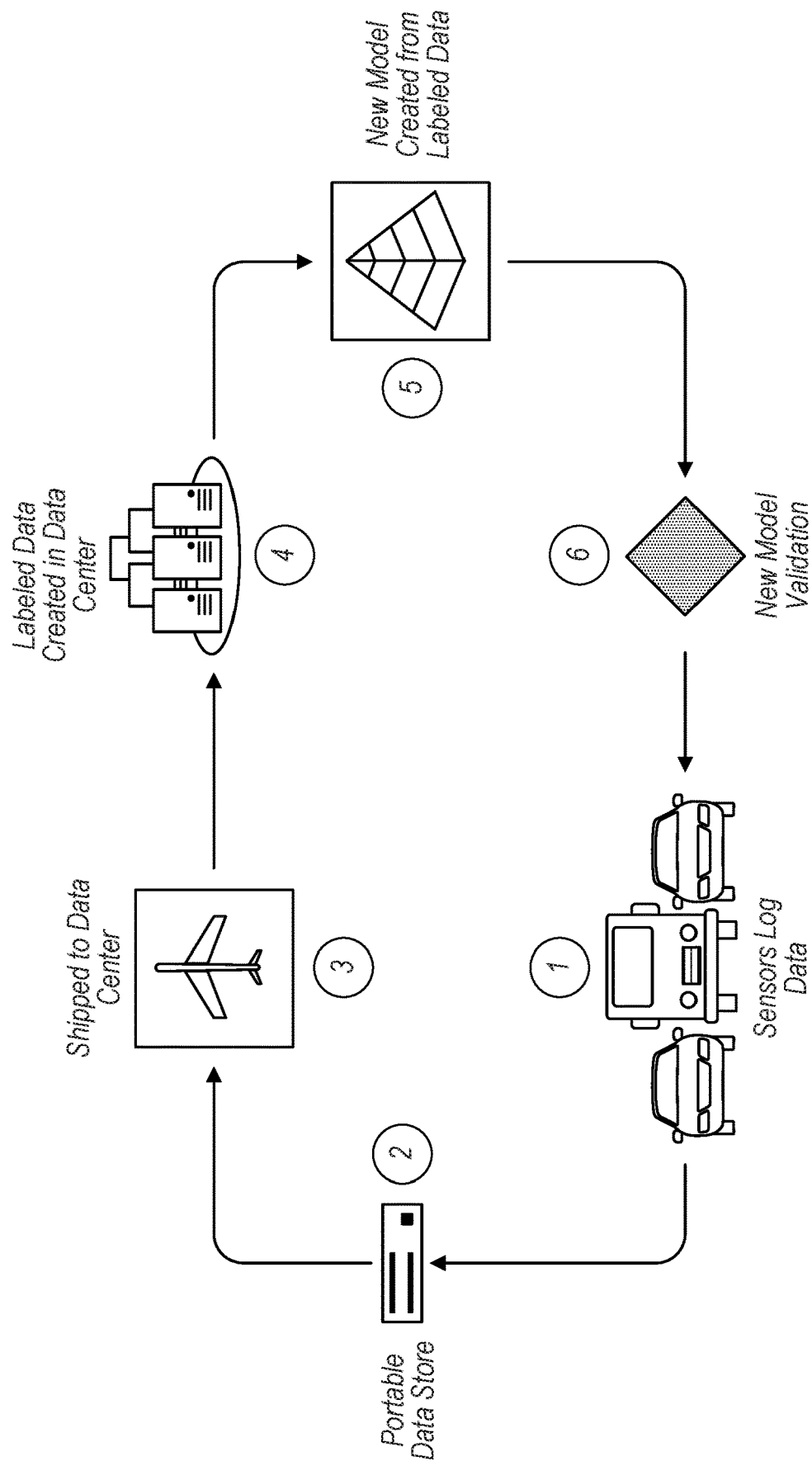
FIG. 8 shows a machine learning test cycle for an autonomous vehicle.

FIG. 8—Machine Learning Test Cycle for an Autonomous Vehicle

Recently there has been a surge in the generation of new types of data for machine learning based test applications. For example, new applications such as Autonomous Vehicles and Advanced Driver Assist Systems (ADAS), analyze the large amounts of data generated by vehicle sensors like cameras, LiDAR sensors and RADAR sensors. The most common data formats used by these applications are ADTF, RTMaps, MDF4 and rosbag.

The sheer volume of data generated by these sensors creates extremely long testing times. FIG. 8 depicts a Machine Learning Test Cycle for an Autonomous Vehicle. Vehicular sensors may generate Logged Sensor Data (step 1) which may then be transferred to a Portable Data Store (step 2). The Portable Data Store may then be shipped to a Data Center (step 3) where it may be parsed, filtered and manually labeled to become Labeled Data (steps 3 and 4). The Labeled Data may then be used for developing New Models (step 5). The New Models may then undergo New Model Validation (step 6) and may then be deployed back to the vehicles to perform the next test run. This process constitutes one test cycle, and is made particularly time consuming by the amount of processing presently required by the data labelers at Step 4. Therefore, it is desirable to create systems and methods for reducing the amount of required data labeling time.

Data Labeling may be a part of Machine Learning. Labeling refers to adding a meaningful definition, context and explanation for the different parts of unlabeled data. Labeling is used to train machines so that the machines may automatically identify objects from unlabeled data. In the context of computer vision, labelling data may frequently require image annotation, which is the process of manually defining regions in an image and creating text-based descriptions of those regions. The annotation may require the labelers to manually filter through thousands of image documents, recognize objects of interest within the image documents, draw shapes, lines and dots to identify the objects of interest, and to create written text to describe the identified objects of interest.

By considering the labelers to be analogous to the Analysis Application 310 of the data model described herein, an embodiment of the data model may be applied during the transfer of measurement data from the Portable Data Store to the Data Center (step 3) or during the transfer of measurement data from the sensors to the Portable Data Store (step 2). The embodiment may process and analyze the sensor data to automatically and dynamically provide streamlined subsets of data that may be augmented with customized metadata. The introduction of augmented metadata and/or a subset of sensor data (measurement data) at an earlier stage of the Machine Learning Test Cycle may significantly reduce the amount of time needed by the labelers to process the files in the Data Store. This would necessarily result in an overall reduction to the total test cycle time.

Figure 9:
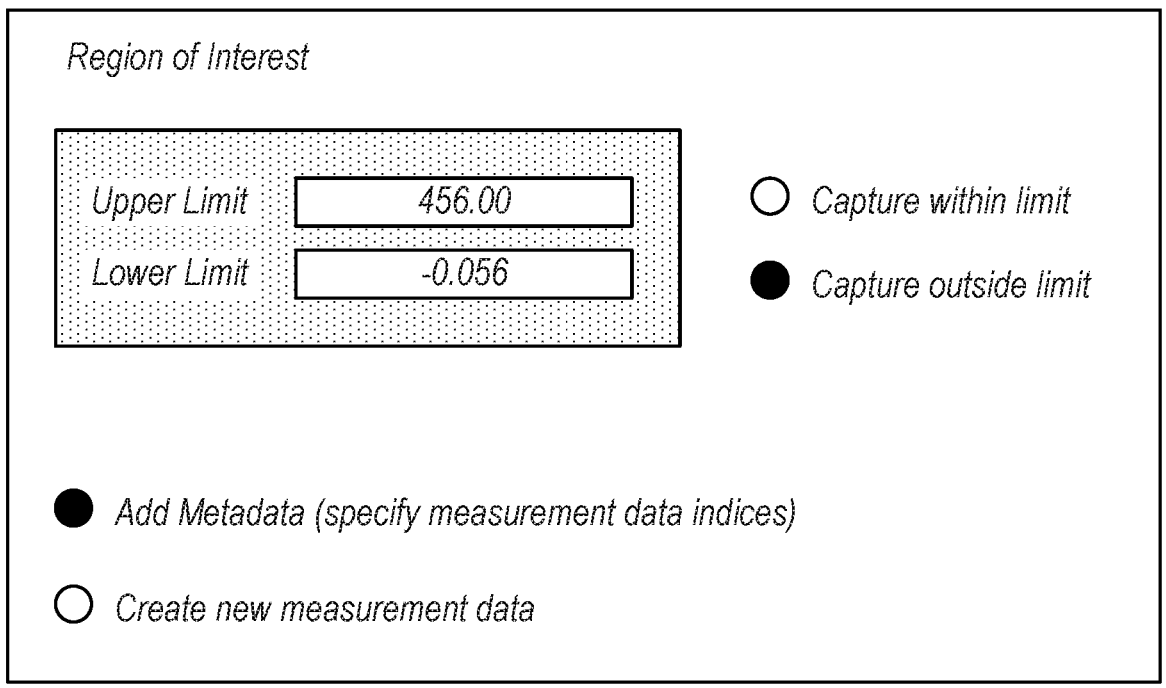
FIG. 9 shows a first example graphical user interface (GUI) for operation with a data management platform according to the measurement data model described herein.
Figure 10:
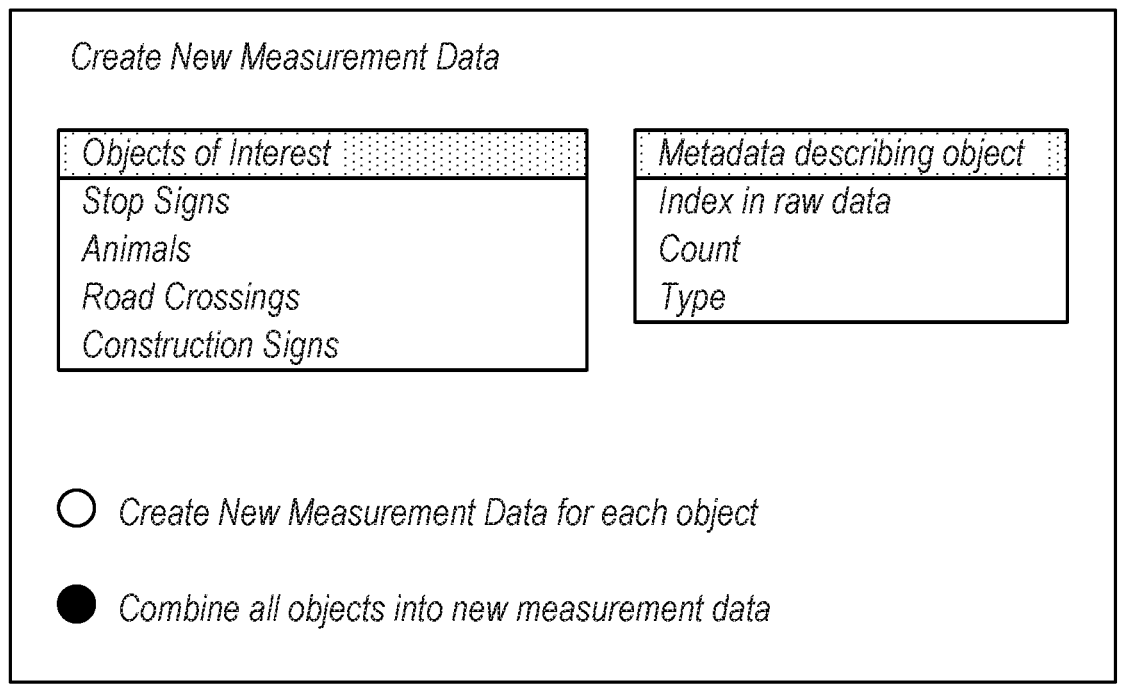
FIG. 10 shows a second example graphical user interface (GUI) for operation with a data management platform according to the measurement data model described herein.
Figure 11:
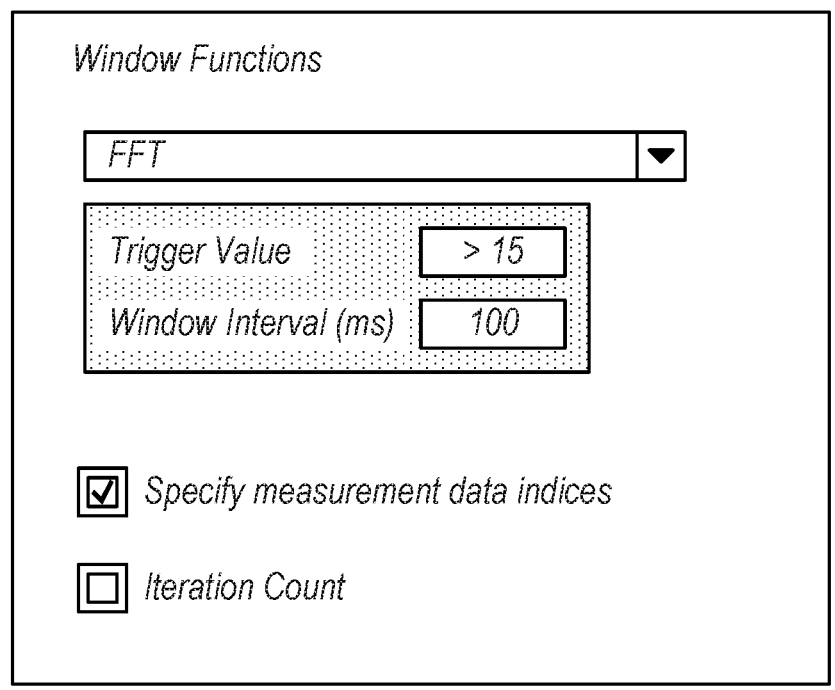
FIG. 11 shows a third example graphical user interface (GUI) for operation with a data management platform according to the measurement data model described herein.

FIGS. 9-11 GUIs

FIGS. 9, 10 and 11 show examples of graphical user interfaces (GUIs) that may be operable in accordance with one or more of the operations described herein. More particularly, these GUIs may be used by a user to specify certain criteria or characteristics for the dynamic creation of new metadata as described above and/or for the identification of measurement data subsets as described above. Embodiments described herein are not limited to these three examples. GUIs may be provided at one or more locations of an embodiment, for example, at the Stream Processor Framework 314, at the Analysis Application 310 and at the File Ingestion Logic 306.

FIG. 9 shows a first example of a GUI in accordance with one embodiment described herein. The GUI allows a user to specify an upper and lower limit in connection with a measurement data set or measurement data sets. The user may first specify whether he would like to analyze the measurement data within the specified limits or outside the specified limits. The user may then specify whether he would like to specify the selected indices as Metadata or if he would like to create a new subset of measurement data based on the selected indices. The information entered by the user may then be used in dynamically analyzing the measurement data during the acquisition and storage process as described above.

FIG. 10 shows a second example of a GUI in accordance with one embodiment described herein. The GUI allows a user to search one or more measurement data sets based on a selected Object of Interest and a selected Metadata. The user may then specify whether he would like to "Create New Measurement Data for each object", i.e., add new metadata associated with each object, or to "Combine all objects into new measurement data", i.e. create a new measurement data subset based on the results of the search. The information entered by the user may then be used in dynamically analyzing the measurement data during the acquisition and storage process as described above.

FIG. 11 shows a third example of a GUI in accordance with one embodiment described herein. The GUI allows a user to perform functions such as a Fast Fourier Transform (FFT) on a set of measurement data. The user may specify a trigger value and a window interval (in milliseconds). The user may choose to request a specification of measurement data indices and/or an iteration count. The information entered by the user may then be used in dynamically analyzing the measurement data and performing the requested FFT on the data, to create either new metadata or a new measurement data subset, during the acquisition and storage process as described above.

We claim:

1. A non-transitory computer readable memory medium comprising program instructions for analyzing measurement data comprising measurement data sets, wherein the program instructions are executable to:
    receive the measurement data from a measurement device;
    extract first metadata associated with the measurement data from the measurement data;
    analyze measurement data points in the measurement data to determine if the measurement data points meet a first criteria;
    generate second metadata associated with first measurement data points of the measurement data points that meet the first criteria;
    provide the measurement data points, the first metadata and the second metadata to a data warehouse for storage, wherein respective first measurement data points, first metadata and second metadata are associated in storage;
    wherein the program instructions are executable to receive and analyze the measurement data points, generate the second metadata, and provide the measurement data points, the first metadata and the second metadata to the data warehouse dynamically as the measurement data is received and moved to the data warehouse as a single process without intervening storage of the measurement data in the data warehouse.

2. The non-transitory computer readable memory medium of claim 1,
    wherein the measurement data comprises measurement data files stored in a first storage;
    wherein the program instructions are executable to receive and analyze the measurement data files, generate the second metadata, and provide the measurement data points, the first metadata, and the second metadata to the data warehouse dynamically as the measurement data files are being received and moved from the first storage to the data warehouse.

3. The non-transitory computer readable memory medium of claim 1,
    wherein the program instructions are further executable to receive user input specifying the first criteria prior to analyzing the measurement data to determine if the measurement data meet the first criteria.

4. The non-transitory computer readable memory medium of claim 1,
    wherein the program instructions are further executable to:
        identify measurement data subsets based on analysis of the measurement data relative to a second criteria;
        provide an identification of the measurement data subsets to a data warehouse for storage;
        wherein the program instructions are executable to analyze the measurement data, generate the second metadata, and provide the measurement data, the first metadata, the second metadata and the identification of the measurement data subsets to the data warehouse dynamically as the measurement data is received and moved to the data warehouse.

5. The non-transitory computer readable memory medium of claim 4,
    wherein the program instructions are further executable to receive user input specifying the second criteria prior to identifying measurement data subsets based on analysis of the measurement data sets relative to a second criteria.

6. The non-transitory computer readable memory medium of claim 1,
    wherein the first metadata and the second metadata are provided for storage in at least one first table in the data warehouse comprising a plurality of rows, wherein each row of the first table comprises:
        a first data set identification (ID) field which stores a data set identifier value identifying a measurement data set; and
        one or more fields for storing measurement data metadata associated with the data set identified by the data set identifier value in the first data set ID field.

7. The non-transitory computer readable memory medium of claim 6,
    wherein measurement data points are provided for storage in at least one second table in the data warehouse comprising a plurality of rows, wherein each row of the second table comprises:
        a second data set ID field which stores the data set identifier value present in the first data set ID field of the first table, thereby creating a correspondence between rows of the first table and rows of the second table;

a datapoints field for storing individual data set datapoints associated with the measurement data set; and a data set index field corresponding to an ordering of the individual data set datapoints;

wherein at least a portion of each of the fields of the first table are stored in a columnar format in contiguous memory; and wherein at least a portion of each of the fields of the second table are stored in a columnar format in contiguous memory.

8. The non-transitory computer readable memory medium of claim 1, wherein in analyzing the measurement data points in the measurement data to determine if the measurement data points meet a first criteria, the program instructions are executable to determine if the measurement data points have values which exceed a threshold.

9. The non-transitory computer readable memory medium of claim 1, wherein the measurement data comprises one or more images;

wherein in analyzing the measurement data points in the measurement data to determine if the measurement data points meet a first criteria, the program instructions are executable to determine if the measurement data points represent an object of interest.

10. A method for analyzing measurement data comprising measurement data sets, the method comprising:

receiving the measurement data, wherein the measurement data is received from one or more measurement devices;

analyzing the measurement data to determine if measurement data points in the measurement data meet a first criteria;

generating metadata associated with first measurement data points of the measurement data points that meet the first criteria;

storing the measurement data and the metadata in a data warehouse, wherein respective first measurement datapoints and metadata are associated in storage;

wherein the measurement data is received and analyzed, the metadata is generated, and the measurement data and the metadata is stored in the data warehouse dynamically as the measurement data is received and moved to the data warehouse as a single process without intervening storage of the measurement data in the data warehouse.

11. A system for analyzing measurement data comprising measurement data sets, the system comprising:

a file ingestion logic module, wherein the file ingestion logic module is configured to:

receive the measurement data and first metadata associated with the measurement data;

extract measurement data points based on information in the measurement data; and provide the measurement data points and the first metadata;

a streaming module coupled to the file ingestion logic module, wherein the streaming module is configured to:

receive the measurement data points and the first metadata from the file ingestion logic module;

analyze the measurement data points relative to a first criteria to generate second metadata based on the analysis; and provide the measurement data points, the first metadata and the second metadata to a data warehouse for storage, wherein respective measurement data points, first metadata and second metadata are associated in storage;

wherein the file ingestion logic and the streaming module are configured to extract and analyze the measurement data points, generate the second metadata, and provide the measurement data points, the first metadata, and the second metadata to the data warehouse dynamically as the measurement data is being extracted and moved to the data warehouse as a single process without intervening storage of the measurement data in the data warehouse.

12. The system of claim 11, wherein the streaming module is further configured to identify measurement data subsets based on analysis of the measurement data sets relative to a second criteria;

provide an identification of the measurement data subsets to a data warehouse for storage;

wherein the file ingestion logic and the streaming module are configured to extract and analyze the measurement data points, generate the second metadata, and provide the measurement data points, the first metadata, the second metadata and the identification of the measurement data subsets to the data warehouse dynamically as the measurement data is extracted and moved to the data warehouse.

13. The system of claim 11, wherein the measurement data is received from a measurement device; and wherein the file ingestion logic and the streaming module are further configured to extract and analyze the measurement data points, generate the second metadata, and provide the measurement data points, the first metadata and the second metadata to the data warehouse dynamically as the measurement data is extracted and moved from the measurement device to the data warehouse.

14. The system of claim 11, wherein the measurement data comprises measurement data files stored in a first storage;

wherein the file ingestion logic and the streaming module are further configured to extract and analyze the measurement data files, generate the second metadata, and provide the measurement data points, the first metadata, and the second metadata to the data warehouse dynamically as the measurement data files are being extracted and moved from the first storage to the data warehouse.

15. The system of claim 11, wherein the system is further configured to receive user input specifying the first criteria prior to extracting and analyzing the measurement data points in the measurement data to determine if the measurement data points meet the first criteria.

16. The system of claim 11, wherein the system further comprises one or more memory mediums which form the data warehouse;

wherein the one or more memory mediums comprise at least one first table which contains the first metadata and the second metadata, wherein the at least one first table comprises a plurality of rows, wherein each row of the first table comprises:

a first data set identification (ID) field which stores a data set identifier value identifying a measurement data set; and one or more fields for storing measurement data metadata associated with the data set identified by the data set identifier value in the first data set ID field.

17. The system of claim 16,
wherein the one or more memory mediums comprise at least one second table which contains the measurement data, wherein the at least one second table comprises a plurality of rows, wherein each row of the second table comprises:
a second data set ID field which stores the data set identifier value present in the first data set ID field of the first table, thereby creating a correspondence between rows of the first table and rows of the second table;
a datapoints field for storing individual data set datapoints associated with the measurement data set; and
a data set index field corresponding to an ordering of the individual data set datapoints;
wherein at least a portion of each of the fields of the first table are stored in a columnar format in contiguous memory; and
wherein at least a portion of each of the fields of the second table are stored in a columnar format in contiguous memory.

18. A system for analyzing measurement data comprising measurement data sets, the system comprising:
a file ingestion logic module, wherein the file ingestion logic module is configured to:
receive the measurement data;
create measurement events based on information in the measurement data;
extract first metadata from the measurement data to create a first set of metadata events; and
provide the measurement events and the metadata events;
a streaming module coupled to the file ingestion logic module, wherein the streaming module is configured to:
receive the measurement events and the first set of metadata events from the file ingestion logic module;
generate second metadata based on analysis of the measurement events relative to a first criteria; and
provide the measurement data, the first set of metadata events and the second set of metadata events to the data warehouse for storage, wherein respective first measurement data points, first metadata and second metadata are associated in storage;
wherein the file ingestion logic and the streaming module are configured to generate the second metadata, and provide the measurement data, the first metadata, and the second metadata to the data warehouse dynamically as the measurement data is being moved to the data warehouse as a single process without intervening storage of the measurement data in the data warehouse.

* * * * *